(12) United States Patent
Gudmundsson et al.

(10) Patent No.: US 8,327,799 B2
(45) Date of Patent: Dec. 11, 2012

(54) MILKING STATION ARRANGEMENT FOR AND METHOD OF OBTAINING A REPRESENTATIVE MILKING SAMPLE

(75) Inventors: Mats Gudmundsson, Sodertalje (SE); Juoko Raninen, Marsta (SE); Nils Erik Holmertz, Huddinge (SE); Carina Fjallmyr, Grodinge (SE); Staffan Persson, Tumba (SE); Epke Bosma, Holo (SE)

(73) Assignee: DeLaval Holding AB, Tumba (SE)

( * ) Notice: Subject to any disclaimer, the term of this patent is extended or adjusted under 35 U.S.C. 154(b) by 311 days.

(21) Appl. No.: 12/865,511

(22) PCT Filed: Jan. 27, 2009

(86) PCT No.: PCT/SE2009/050082
§ 371 (c)(1),
(2), (4) Date: Jul. 30, 2010

(87) PCT Pub. No.: WO2009/096888
PCT Pub. Date: Aug. 6, 2009

(65) Prior Publication Data
US 2010/0326359 A1 Dec. 30, 2010

(30) Foreign Application Priority Data
Jan. 30, 2008 (SE) ...................................... 0800227

(51) Int. Cl.
*A01J 5/007* (2006.01)
(52) U.S. Cl. .................. 119/14.01; 119/14.02
(58) Field of Classification Search ............... 119/14.01, 119/14.18, 14.02, 14.14
See application file for complete search history.

(56) References Cited

U.S. PATENT DOCUMENTS

| 5,957,081 | A  | * | 9/1999  | van der Lely et al. ..... | 119/14.09 |
| 7,234,414 | B2 | * | 6/2007  | Claycomb et al. .......... | 119/14.02 |
| 7,882,801 | B2 | * | 2/2011  | Akerman .................... | 119/14.02 |
| 8,072,596 | B2 | * | 12/2011 | Katz et al. .................. | 356/319   |
| 8,074,600 | B2 | * | 12/2011 | Kallen et al. ............... | 119/14.04 |

FOREIGN PATENT DOCUMENTS

| DE | 44 38 434 C1    | 3/1996  |
| DE | 195 47 892 A1   | 7/1997  |
| EP | 0 217 155 A2    | 4/1987  |
| EP | 0 564 023 A1    | 10/1993 |
| GB | 1 112 971 A     | 5/1968  |
| GB | 1 250 936 A     | 10/1971 |
| WO | 2007/149036 A1  | 12/2007 |

OTHER PUBLICATIONS

International Search Report, dated Apr. 28, 2009, from corresponding PCT application.

* cited by examiner

*Primary Examiner* — Yvonne Abbott
(74) *Attorney, Agent, or Firm* — Young & Thompson

(57) ABSTRACT

An arrangement for and method of providing a representative sample of milk from one animal, after stirring the milk, includes a receiver, milk extracting parts, a pump transferring milk from the receiver to a sample unit, a circulation line extending from the receiver via the pump and back to the receiver, for stirring the milk in the receiver. The arrangement stirs the extracted milk without injecting air into the milk, before a sample part of the milk is transferred from the receiver to the milk-sampling unit, thereby ensuring that the sampled part is representative of the milk from one animal.

20 Claims, 3 Drawing Sheets

MILKING STATION ARRANGEMENT FOR AND METHOD OF OBTAINING A REPRESENTATIVE MILKING SAMPLE

TECHNICAL FIELD

The present invention relates to milking stations and methods of providing samples of milk, and it concerns providing milk samples being representative for analysis of the milk, in particular its fat content.

BACKGROUND AND PRIOR ART

Milk is a sensitive food product that requires gentle treatment. At the same time it is important to subject the milk for testing, such as an automatic somatic cell counting unit (OCC) to discover infections, and also for establishing how rich the milk is in fat content. Moreover, the fat concentration varies during a milking process and when the milk is received in a container its fat is generally not homogeneously distributed in the container. If a sample of milk is analysed, it is important that the sample is representative of the whole milk quantity.

One way to provide a sample is to take samples continuously during a milking process, which samples are then collected in a sample container. EP, 564023, A1 describes a method where a fraction, 1%, of the milk is sampled during the milking of an animal. This sampling requires that a rather large fraction is sampled to provide a representative sample.

To reduce the risk of providing less representative samples, EP, 564023, A1 also describes a method where all milk extracted from an animal is drawn to a milk meter, where it is subjected to pressurised air, bubbling the milk, so the milk is stirred before a sample is taken.

Besides distributing the fat, such air bubbling process contributes to the emergence of free fatty acids (FFA) in the milk.

SUMMARY OF THE INVENTION

It is an object of the invention to overcome the problems of the prior art so that representative samples of milk can be provided without degrading the quality of the milk by creating high levels of free fatty acids.

For this purpose the invention relates to milking equipment, especially automatic equipment provided with means for sampling the milk. The method according to the invention, and the arrangement performing the method, can be implemented in a milking robot to provide samples of milk being extracted during a milking process that is representative of the extracted total amount of milk. For this purpose the invention provides an arrangement for providing a representative sample of milk in a milking station comprising means for extracting milk from an animal (e.g. a cow), a receiver and a milk pump, wherein the extracting means is adapted to extract milk from an animal and transfer the milk to the receiver, the receiver is preferably adapted to contain the milk from the animal being milked during a milking session, and a pump is adapted to pump milk from the receiver and preferably comprises a main outlet arranged for transferring a main part of the milk from the receiver to a storing tank for receiving milk from several animals and comprises means for transferring a sample part of the milk from the receiver to a sampling unit. This milking station comprises means for stirring the extracted milk and the milking station is preferably adapted to stir the milk before transferring a sample part of the milk from the receiver to the sample unit. The arrangement is characterised in that it comprises a circulation line, for stirring the milk in the receiver, extending from the receiver via the pump and back to the receiver. The arrangement can thus be used to stir the milk, essentially all of the extracted milk, before a sample part of the milk is transferred from the receiver to the milk-sampling unit, thereby ensuring that the sampled part is representative of the milk from one animal, for example with regard to the fat content.

The invention provides a method of the above type that is characterised in stirring the milk in the receiver, by circulating the milk in a circulation line before transferring the sample part from the receiver to the sampling unit.

By stirring substantially all the extracted milk, all of the milk becomes representative and a small fraction can be sampled having the same constitution as the whole milk quantity. Milk can be sampled at any time so there is no need to sample, for example, at the beginning of the process of transfer of the milk from the receiver. Moreover, both the stirring and the transfer of milk can be provided for by the same pump. This also means that the samples are less sensitive to carry over between successive samplings, i.e. less risk that milk from a previously milked animal affects the samples from an animal milked later.

An embodiment provides a method, wherein the stirring is performed by circulating the milk by pumping the milk from the receiver and back to the receiver. Using the same pump involves less risk for carry over of milk from different cows since the milk flows through the same outlet conduit and pump during the stirring prior to a sample part is transferred to the sample unit.

An embodiment of the arrangement comprises a control unit adapted to control the arrangement to stir the milk by means of the circulation line prior to transferring milk to the sample unit. Which control unit preferably is adapted to selectively activate the stirring process. This activation can be used to only stir the milk when an analysis is desired, e.g. for a specific animal, upon detection of abnormal activity or health condition, on a scheduled basis and so forth, so that unnecessary stirring is avoided.

In an embodiment, the circulation line protrudes into the receiver by means of a nozzle. The nozzle preferably protrudes at an angle, so that the re-entering milk is directed at an angle downwards in the receiver. Preferably, the nozzle injects the milk below the milk level in the receiver, so that air is prevented from being drawn into the milk.

An embodiment of the arrangement comprises means for determining the amount of the extracted milk in the receiver and is characterised in that a stirring time period is determined on the basis of the amount in the receiver, to prevent degrading the milk by excessive stirring.

An embodiment of the invention provides an arrangement, wherein the stirring loop includes a return conduit connected to an upper part of the receiver. The return conduit can be connected to or integrated with a nozzle. The nozzle is arranged to inject the circulated milk so that the milk in the receiver is properly stirred.

According to one embodiment the return conduit is arranged to lead the milk into the receiver in a direction at an angle downwards, between 30 to 60 degrees below the horizon, or ca 45 degrees below the horizon.

Alternative, or additionally, the return conduit comprises a plurality of nozzles entering into the receiver. The nozzles may be arranged at different heights of the receiver and/or at the same height. Depending on the actual design of the receiver it is suitable to provide a plurality of nozzles at different heights and/or one or more nozzles at the same height.

According to one embodiment the nozzles are selectable by means of a control unit, e.g. selecting among nozzles having different heights can provide a proper entering height for the circulating milk.

The invention also provides a milking station comprising any of the arrangements described above.

BRIEF DESCRIPTION OF THE DRAWINGS

The invention is described below, by way of example, with reference to the accompanying drawings, in which.

The figures illustrate the parts of the arrangements in accordance with the invention schematically, in side view, the parts are illustrated transparent where appropriate and they are not drawn to scale.

Figure 1:
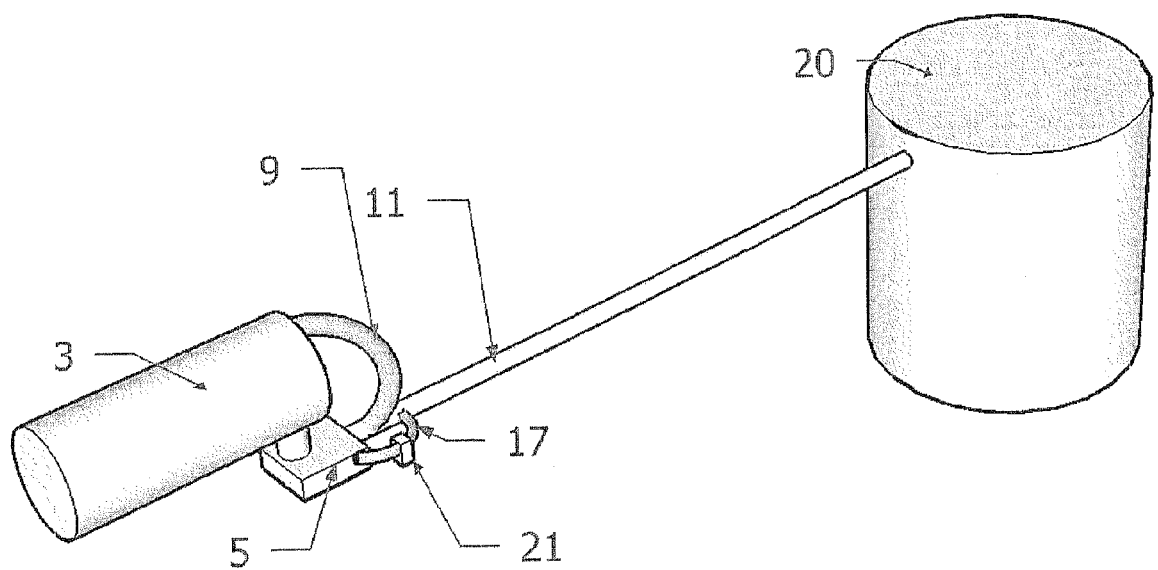
FIG. 1 is a simplified illustration in perspective of parts of the arrangement of a milking station.

FIG. 1 illustrates an embodiment of the invention showing a receiving container or receiver 3 to which milk is drawn by means of vacuum during a milking operation, and from which milk is pumped via a milk line 11 to a storage tank 20 after the milking process. The milking station includes a pump 5 for pumping the milk from the receiver 3 to the storage tank 20. This pump is also used to stir the milk. When the milk is stirred it is pumped via a circulation line 9 back to the receiver 3. After the stirring, the milk is pumped by pump 5 in a main flow, via milk line 11, to the tank 20 and in a minor flow to a sample unit 21, wherein the milk is sampled, e.g. collected in a test tube. The excessive non-sampled milk transferred in the minor flow is transferred back to the main flow in the milk line 11 by being lead in a sample line 17 exiting in the main milk line 11.

Figure 2:
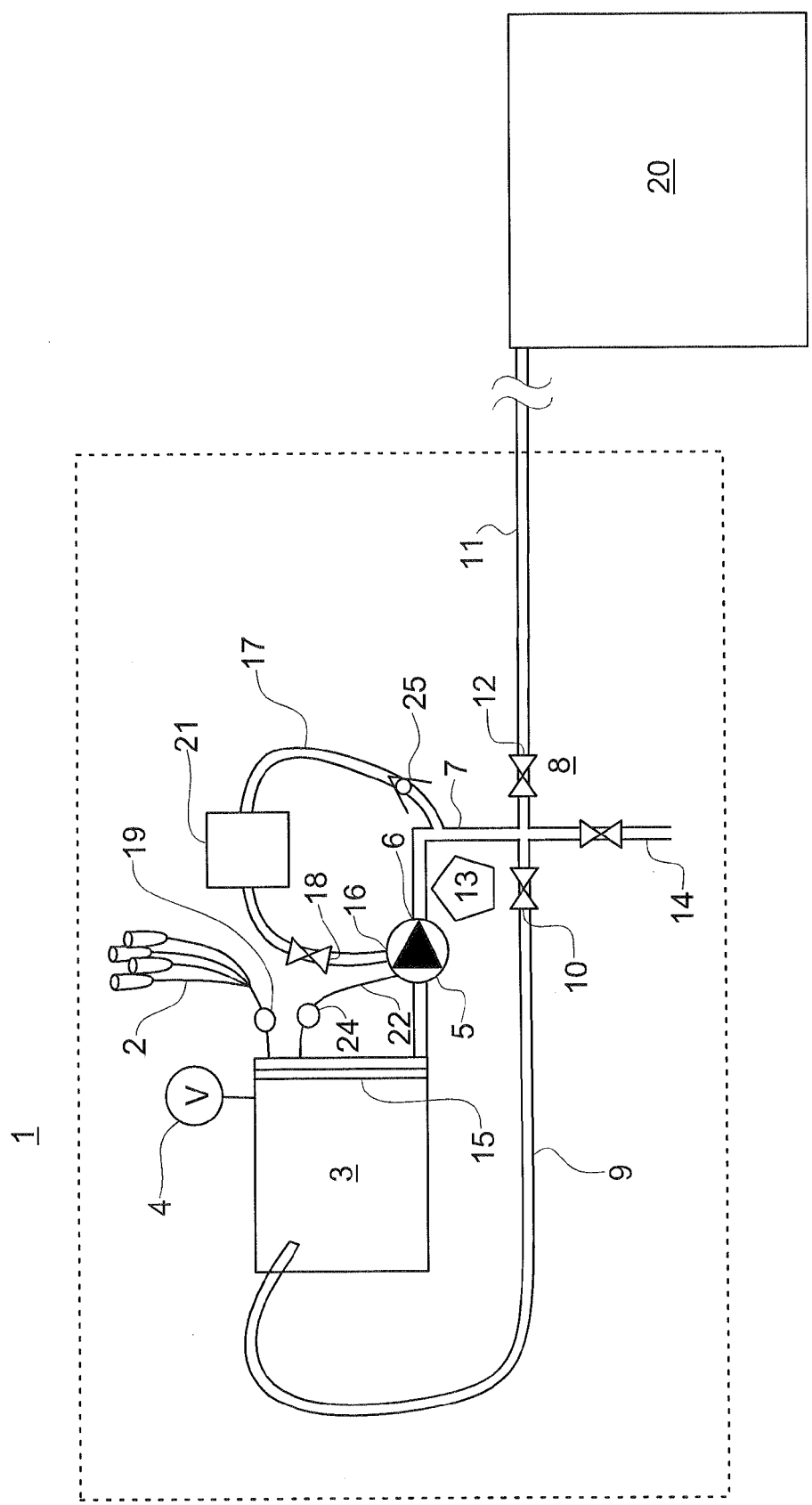
FIG. 2 illustrates an arrangement of a milking station comprising a stirring loop.

FIG. 2 illustrates schematically parts of an automatic milking station 1 or milking robot for milking animals, such as cows. The milking station comprises teat cups and hoses 2 connected to a milk receiver 3 that is connected to a vacuum source 4 so that the receiver can be put under vacuum to draw milk from the animal to the receiver. The receiver 3 is connected to a milk storage tank 20, to transfer milk to the storage tank after milking an animal. For this purpose a milk pump 5 is arranged at the receiver, at its outlet, which pump 5 is connected to the storage tank 20 via a valve arrangement 8, including a tank valve 12 that is arranged for selectively connecting the first part of the milk line 7, from a main outlet 6 of the pump 5 to the tank conduit or the milk line 11. The valve arrangement 8 also includes a waste valve 14 for connecting the receiver 3, via the first part 7 of the milk line, and transferring milk of inferior quality, to a drain or a separate container.

At the beginning of a milking process, the teat cups 2 are connected to the animal to be milked, after which milk is extracted and drawn to the receiver 3. The size of the receiver 3 is suitably adapted to contain the amount of milk being extracted during a single milking process of an animal. At the end of the milking process the milk is transferred from the receiver 3, by the pump 5, to the storage tank 20 via milk line 11. It would also be possible to transfer the milk from the receiver by gravity, suitably providing the storage tank at a lower level than the receiver. The storage tank is much larger than the receiver and adapted to contain milk extracted during several milking occasions of several animals. It also includes cooling means, not illustrated, for cooling the milk. Before, or sometime when, the milk is pumped to the storage tank 20 a fraction of it can be sampled for analysis. For this purpose, a minor outlet 16 of the pump 5 is connected to a sample unit 21, via a selectively activated sample valve 18 and a sample pipe or line 17. The sample line 17 leads excessive milk back to the milk line 7, via a non-return valve 25. Milk can be lead via milk line 7 passing the sample unit 21 before a milk sample is taken. In this way carry-over of milk from a first animal to a milk sample from a second animal can be prevented.

The milking station 1 also comprises means for stirring the milk before it is transferred to the sample unit 21. These stirring means comprises a return line 9 providing a return conduit 9, selectively connectable by means of a stirring valve 10 connected to the pump 5 outlet 6 via the first part 7 of the milk line 11, so that pumped milk can be lead back to the receiver 3. In this way the milk is pumped by the pump 5 in a loop through the return conduit 9 where it stirs the milk in the receiver so that the milk attains a more homogenous composition, especially the fat is more evenly distributed, before transferring the milk to the sample unit 21.

The milking station includes a controller or control unit 13, adapted to control the milking process, the stirring process and the transferring process. Especially, the control unit 13 controls the valves 8, 10, 14, 18, milking means 2, vacuum 4 and pump 5 during these processes and obtains measurements from the flow meter 19 and/or level detector 15 and from the cell counter 24. When the control unit 13 controls the stirring of milk, which has been extracted from an animal, in the receiver 3, the stirring process can be initiated before the milking process is finished so that a part of the milk is being stirred before all the milk has been extracted. The control unit can also interrupt the stirring and resume stirring providing an intermittent stirring process. It is important to provide a thorough stirring of the milk, still creating a minimum level of free fatty acids in the milk during this process. If an intermittent stirring process is performed, the total time of its contained short stirring intervals is shorter than the milking process.

The milking station includes means for determining the amount of milk that is extracted when milking an animal, such as, a flow meter 19 arranged at the hose measuring the milk flow from the teat cups to the receiver and/or a level sensor or detector 15 in the receiver arranged to detect the milk level in the receiver. It is also possible to have one receiver per teat cup, e.g. one teat cup, one hose, one flow meter and one receiver, or receiver compartment, for every teat of the animal. As noted previously, since the stirring process is performed for mixing and blending the milk to a more homogenous composition with the fat evenly spread, it runs the risk of affecting the milk negatively by creating free fatty acids (FFA). To prevent the creation of FFA the stirring is limited to a minimum for every given volume of milk. When the flow meter 19 or level detector 15 has determined the amount of milk, the time for the stirring operation can be determined based on this volume. Thus, the control unit 13 uses the determined volume indication to define a stirring time period, and interrupts the stirring when this time period has lapsed. If an intermittent stirring process is performed, the total time, of its contained short stirring intervals, is limited by this determined stirring time period.

Depending on the actual conduits, reservoirs and pumps used the time needed to stir the milk varies. When dimensioning the arrangement a succession of tests can suitably be performed where the milk is stirred until it is sufficiently mixed. The milk can, for example, be sampled at regular time intervals during the stirring process to determine how long the minimum stirring time period is for any given quantity of milk.

Pumping the milk in a stirring loop performs the stirring process. The same pump can be used for stirring as well as transferring the milk. For this purpose, a two-speed pump, or another type of pump such as a frequency variable speed pump, can be used. This pump is then arranged to provide a higher speed when stirring the milk and a lower speed during transfer of milk to the storage tank 20 and the sample unit 21. The loop comprises the receiver outlet line 7, i.e. the first part of milk line 11, pump 5 and the return conduit 9. The milk is lead out of the receiver and pumped back into the receiver, i.e. the stirring is performed by milk, which has left the receiver and has been outside the receiver, that enters the receiver again. The milk, thus, enters the receiver the first time during milking by means of vacuum, and the second time during stirring by means of pumping by the pump. Moreover, the return conduit 9 leads the milk back into the receiver via a nozzle extending into the receiver, preferably at an angle. The nozzle is arranged to inject the circulated milk so that the milk in the receiver is stirred. The angle is between 30 and 60 degrees below the horizon, as illustrated approximately 45 degrees. Preferably, the nozzle injects the milk below the milk level in the receiver, so that air is prevented from being drawn into the milk. After the stirring, the milk is transferred by the pump in a main flow to the storage tank 20 and a minor flow through the sample unit 21 where a sample e.g. can be extracted in a sample bottle for further analysis of, preferably, the fat content.

Figure 3:
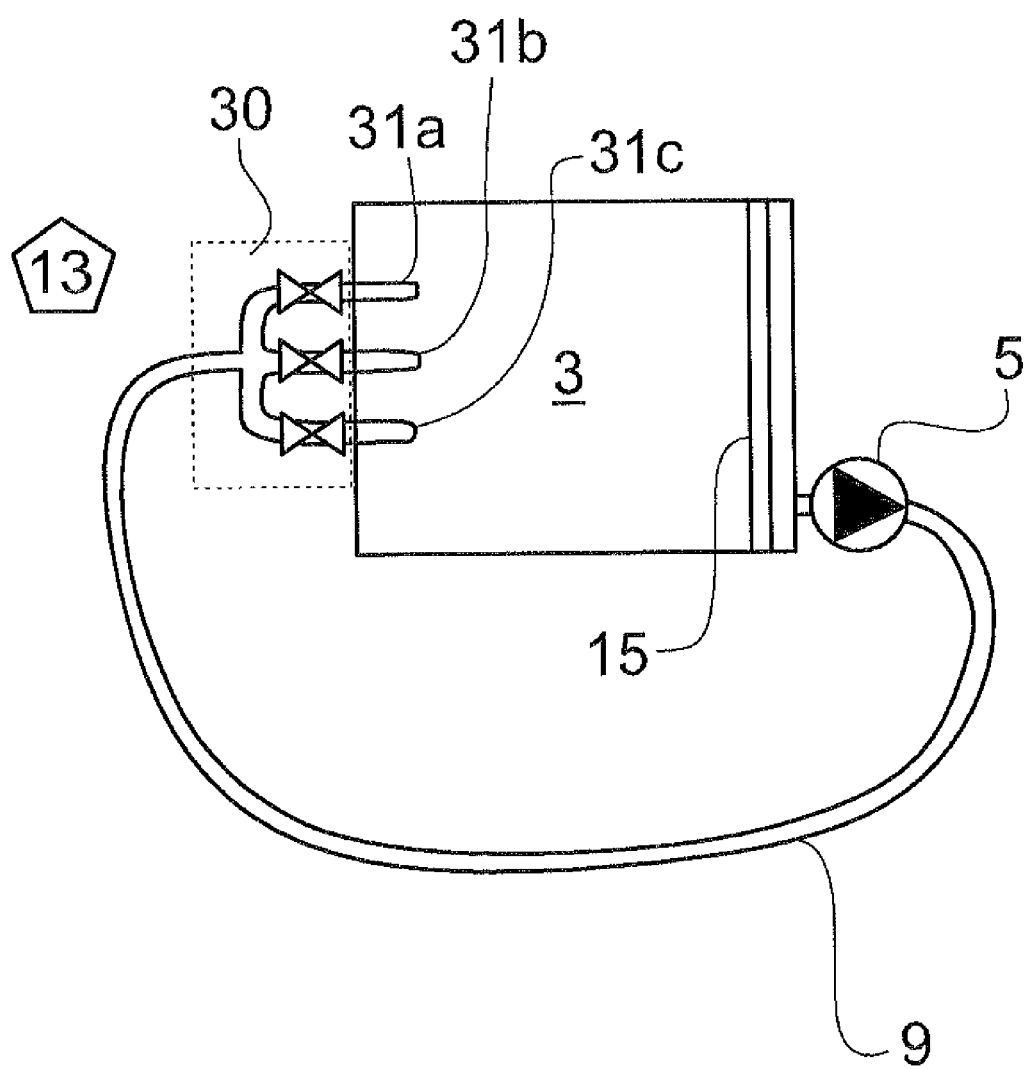
FIG. 3 illustrates an embodiment having a circulation line provided with three nozzles entering the receiver.

FIG. 3 illustrates an embodiment where the milk is lead back into the receiver at different heights. In this embodiment, the circulation line 9 comprises a plurality of nozzles 31*a-c* entering into the receiver 3. The control unit 13 is preferably able to selectively 30 lead the milk through the nozzles 31*a-c*, by means of a valve arrangement 30 adapted to lead milk from the circulation conduit 9 into the receiver through one of the nozzles 31*a-c* that enters into the receiver at different heights. The control unit 13 is adapted to choose the entering height, by choosing inlet 31*a-c*, on the basis of the amount of milk, for example determined by a level detector 15. Preferably the control unit choose nozzle or nozzles that inject the milk below the surface level of the milk in the receiver and towards the bottom of the receiver. These embodiments can also be used in combination with the embodiment where the circulation or stirring time is limited and/or the embodiment using a pump 5 with variable speed. Depending on the actual design of the receiver it is suitable to provide a plurality of nozzles at different heights and/or one or more nozzles at the same height. These nozzles 31*a-c* enter the receiver in a horizontal direction, but can be arranged to lead the milk in a direction downwards, as described in above regarding FIG. 2. The height of the nozzle opening and the angle is chosen to provide an efficient stirring of the milk in the receiver used, still avoiding mixing air into the milk, and being more careful in comparison to the air bubbling arrangements, as provided by the prior art, that creates high levels of free fatty acids.

The system also includes a separate conduit 24 (illustrated in FIG. 2) or cell counting line, from, a separate outlet of, the pump 5 back to the receiver 3, passing milk to an SCC unit 22, such as an automatic online cell counter (OCC), to detect infections. The system is suitably arranged to transfer milk in this minor flow loop independently from the stirring process, during a milking process, to detect if the extracted milk is unfit for consumption.

The more powerful stirring process, in accordance with the invention, for dispersing the constituents of the milk can suitably be activated for selected milking occasions. For this purpose the control unit 13 of the system can be provided with a user interface for receiving inputs and be adapted to activate the stirring process to provide milk samples for analysis on demand rather than as a default test. It is suitable to provide the arrangement with means for allowing the farmer to select specific animals for testing, a group of animals or the whole herd. Milking stations comprising the arrangement can also be adapted to receive input from sensors and/or monitoring equipment indicating that the milk of the animal should be analysed, e.g. physiological data, behaviour monitoring data, when data from previous analyses indicate a specific condition, for diagnosing, or measuring effects of nourishments etc. The arrangement can also include a scheduling scheme for sampling on the basis of the identity of the animal. In this way the stirring process is only performed when samples is to be taken. Thus, if stirring has not been performed, the pump transfers the milk in a main flow to the storage tank 20, but there is no milk transferred in the minor flow through the sample unit 21.

The invention claimed is:

1. An arrangement in a milking station for providing a representative sample of milk from one animal, the arrangement comprising:
    a receiver (3), the receiver adapted to contain the milk from the animal being milked during a milking session;
    milk extracting parts (2, 4) connected to the receiver, the milk extracting parts for extracting the milk from the animal to the receiver (3);
    a pump (5) connected to an outlet of the receiver to pump the milk from the receiver;
    a milk line (7, 11) connected to an outlet side of the pump to receive the milk pumped from the receiver;
    a milk storage tank (20) having an inlet connected, via the milk line, to the outlet side of the pump;
    a milk sample unit (21) having an inlet side connected to the outlet side of the pump;
    a milk sample line (17) connecting an outlet side of the sample unit (21) to the milk line at the outlet side of the pump at a location upstream of the inlet of the milk storage tank; and
    a circulation line (9) connected to the outlet side of the pump, the circulation line running back to the receiver to return milk pumped out of the receiver by the pump back to the receiver,
    wherein the pump (5) is operative to receive the milk from the receiver and pump the received milk i) to the sample unit, ii) to the milk storage tank, and iii) back to the receiver via the circulation line, the pumping of the milk via the circulation line back to the receiver providing a stirring of the milk in the receiver.

2. The arrangement according to claim 1, further comprising:
    a control unit (13) adapted to selectively control a flow of the pump from the receiver to the sample unit, the storage tank, and back to the receiver,
    wherein, the control unit provides for stirring of the milk by circulation, via the circulation line, back to the receiver prior to pumping the milk to the sample unit.

3. The arrangement according to claim 2, wherein the control unit (13) is adapted to selectively activate the stirring process.

4. The arrangement according to claim 1, wherein the circulation line (9) protrudes into the receiver and injects the milk into the receiver via a nozzle.

5. The arrangement according to claim 4, wherein the nozzle protrudes at an angle, so that the re-entering milk is directed at an angle downwards into the receiver.

6. The arrangement according to claim 5, wherein the nozzle injects the milk below a milk level and prevents air from being drawn into the milk.

7. The arrangement according to claim 1, wherein the circulation line (9) comprises a plurality of nozzles (31a-c) configured to inject the milk into the receiver while prevent air from being drawn into the milk.

8. The arrangement according to claim 7, comprising a control unit (13) connected to the plural nozzles and configured for selectively leading the milk (13, 30) through the nozzles (31a-c) into the receiver.

9. The arrangement according to claim 1, wherein the pump (5) is a variable speed pump.

10. The arrangement according to claim 1, further comprising:
a milk determining unit arranged to determine the amount of milk (15, 19) in the receiver (3); and
a stirring unit arranged to determine a stirring time period based on the determined amount of milk in the receiver,
wherein the stirring is terminated when the determined stirring time period lapses.

11. The arrangement according to claim 10, wherein the milk determining unit is configured for repeatedly determining the amount of milk present in the receiver.

12. The arrangement according to claim 1, further comprising:
a valve arrangement connected to the outlet side of the pump,
the valve arrangement providing for selectively pumping the milk from the pump (5) back to the receiver (3) via the circulation line (9) and to the milk storage tank via the milk line (11).

13. The arrangement according to claim 1, wherein the milk extracting parts includes a vacuum source (4) arranged to draw milk from the animal to the receiver (3).

14. The arrangement of claim 1, wherein,
the receiver (3) is sized to contain all the milk extracted from the animal being milked during the milking session, and
the milk storage tank (20) is sized to contain milk extracted during plural milking sessions of plural animals.

15. An arrangement in a milking station for providing a representative sample of milk from one animal comprising:
a receiver (3), the receiver adapted to contain the milk from the animal being milked during a milking session;
a milk sample unit (21);
milk transferring parts (17) connecting to the receiver to the sample unit transferring milk from the receiver to a sample unit (21);
a circulation line (9) connected to return milk to the receiver;
a nozzle connected to the circulation line (9) and protruding into the receiver, the nozzle arranged to inject the milk into the receiver while preventing air from being drawn into the milk; and
a pump (5) connected to receive milk from the receiver and pump the received milk back to the receiver via the circulation line, the pumping of the milk via the circulation line back to the receiver comprising a stirring process stirring the milk in the receiver,
wherein the nozzle injects the milk below a milk level within the receiver.

16. A method of providing a representative milk sample from a one animal, the method comprising:
extracting milk from an animal into a receiver;
stirring the milk prior to sampling by circulating the milk from the receiver, via a pump connected to receive the milk from the receiver and then, via a circulation line, return the received milk back into the receiver so that the returned milk provides a stirring of the milk in the receiver, the stirring avoiding injection of air into the milk when circulating the returned milk back into the receiver; and
transferring the milk from the receiver to a sampling unit for sampling.

17. The method according to claim 16, wherein the milk is circulated back to the receiver at a higher speed than the milk is transferred to the sampling unit.

18. The method according to claim 16, comprising the further steps of:
determining the amount of milk in the receiver:
determining a stirring time on the basis of the determined amount of milk in the receiver; and
terminating the stirring when the stirring time is lapsed.

19. The method of claim 16, wherein,
the returned milk is circulated into the receiver from the circulation line via a nozzle connected to the circulation line (9), the nozzle protruding into the receiver, the nozzle arranged to inject the milk into the receiver while preventing air from being drawn into the milk.

20. The method of claim 19, wherein,
wherein the nozzle injects the milk below a milk level within the receiver.

* * * * *